United States Patent
Jobin

(10) Patent No.: US 11,881,040 B2
(45) Date of Patent: *Jan. 23, 2024

(54) EAR INSERT SHAPE DETERMINATION

(71) Applicant: SNUGS TECHNOLOGY LIMITED, Somerset (GB)

(72) Inventor: Paul Jobin, Somerset (GB)

(73) Assignee: Snugs Technology Ltd, Watchet (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,946

(22) Filed: Nov. 1, 2021

(65) Prior Publication Data

US 2022/0058374 A1     Feb. 24, 2022

Related U.S. Application Data

(63) Continuation of application No. 16/958,692, filed as application No. PCT/EP2018/086588 on Dec. 21, 2018, now Pat. No. 11,163,975.

(30) Foreign Application Priority Data

Dec. 29, 2017    (GB) ..................... 1722295

(51) Int. Cl.
*G06V 20/64* (2022.01)
*B33Y 30/00* (2015.01)
(Continued)

(52) U.S. Cl.
CPC ............ *G06V 20/647* (2022.01); *B33Y 30/00* (2014.12); *B33Y 50/02* (2014.12); *B33Y 80/00* (2014.12);
(Continued)

(58) Field of Classification Search
None
See application file for complete search history.

(56) References Cited

U.S. PATENT DOCUMENTS

| 2004/0218788 A1* | 11/2004 | Geng | ...................... G06V 40/10 |
| | | | 382/118 |
| 2008/0013794 A1* | 1/2008 | Kalker | ..................... G07C 9/37 |
| | | | 382/115 |

(Continued)

FOREIGN PATENT DOCUMENTS

| WO | 2004070563 | 8/2004 |
| WO | 2013149645 | 10/2013 |

(Continued)

OTHER PUBLICATIONS

Examination Report, GB2005440.9 (dated Jun. 12, 2020).
(Continued)

*Primary Examiner* — Delomia L Gilliard
(74) *Attorney, Agent, or Firm* — William H. Bollman

(57) ABSTRACT

There is provided a method of determining a three-dimensional shape of an insert for insertion into an ear. The method includes receiving image data corresponding to a two-dimensional image of an ear, processing the image data to measure at least one biometric feature of the ear, the at least one biometric feature being indicative of a three-dimensional shape of at least part of the ear, and determining a three-dimensional shape of an insert for insertion into the ear by matching said at least one biometric feature with one of a plurality of pre-stored three-dimensional shapes. Each pre-stored three-dimensional shape corresponds to a respective ear.

21 Claims, 14 Drawing Sheets

(51) Int. Cl.
   *B33Y 50/02* (2015.01)
   *B33Y 80/00* (2015.01)
   *G06T 7/50* (2017.01)
   *G06T 7/70* (2017.01)
   *G06T 7/00* (2017.01)
   *G06T 7/60* (2017.01)
   *H04R 1/10* (2006.01)

(52) U.S. Cl.
   CPC .............. *G06T 7/0004* (2013.01); *G06T 7/50* (2017.01); *G06T 7/60* (2013.01); *G06T 7/70* (2017.01); *H04R 1/1016* (2013.01); *H04R 1/1058* (2013.01); *G06T 2207/30168* (2013.01); *G06T 2207/30196* (2013.01); *H04R 2460/09* (2013.01)

(56) References Cited

U.S. PATENT DOCUMENTS

| | | | | |
|---|---|---|---|---|
| 2009/0070415 | A1* | 3/2009 | Kishi | G06V 10/26 707/E17.014 |
| 2010/0296664 | A1* | 11/2010 | Burgett | A61F 11/08 381/67 |
| 2014/0118479 | A1* | 5/2014 | Rapoport | H04N 5/23238 348/E7.001 |
| 2015/0073262 | A1 | 3/2015 | Roth et al. | |
| 2015/0139540 | A1* | 5/2015 | Moraleda | G06V 10/96 382/164 |
| 2017/0345399 | A1* | 11/2017 | Lee | G06F 1/1686 |
| 2018/0261001 | A1* | 9/2018 | Wang | G06T 7/90 |
| 2020/0268260 | A1* | 8/2020 | Tran | A61B 5/6817 |

FOREIGN PATENT DOCUMENTS

| | | | | |
|---|---|---|---|---|
| WO | WO-2013149645 | A1* | 10/2013 | .......... A61B 5/0035 |
| WO | 2019129709 | | 7/2019 | |
| WO | WO-2019129709 | A1* | 7/2019 | .............. A61F 11/08 |

OTHER PUBLICATIONS

"Further Developments in Geometrical Algorithms for Bar Biometrics", Michal Choras, Image Processing Group, Institute of Telecommunications, University of Technology & Agriculture, Poland.
International Search Report, PCT/EP2018/086588, dated April 7, 2019.
Written Opinion of the International Searching Authority, PCT/EP2018/086588, dated April 7, 2019.
"Ear Recognition: Biometric Identification using 2- and 3-Dimensional Images of Human Ears", Anika Pflug, Dec. 31, 2015
"Ear Contour Detection and Modeling Using Statistical Shape Models", Atish Ravindran, May 31, 2014.
U.S. Appl. No. 16/958,692, filed Jun. 27, 2020, prosecution history.
"Ear Recognition by Means of a Rotation Invariant Descriptor", Abate et al. (2006)

* cited by examiner

EAR INSERT SHAPE DETERMINATION

The present application is a continuation of U.S. application Ser. No. 16/958,692, filed Jun. 27, 2020, which is a US National Stage Entry of PCT/EP2018/086588, filed Dec. 21, 2018, which in turn claims priority from GB 1722295.1, filed Dec. 29, 2017, the entirety of all of which are explicitly incorporated herein by reference.

TECHNICAL FIELD

The present invention relates to methods, apparatus and systems for determining a three-dimensional shape of an insert for insertion into an ear from a two-dimensional image of the ear. The invention has particular, but not exclusive, relevance to the manufacture of an earbud whose shape is customised to fit in an ear.

BACKGROUND

Systems for manufacturing custom earbuds are known. Generally, such systems either utilise a mould or specialist equipment to determine a shape for insertion into the ear. For example, it is known to produce custom-fitted in-ear headphones for a person that are typically more comfortable, and less likely to fall out of the ear, than standardised non-custom earbuds. There is, however, a desire to develop an alternative methodology for determining the shape of an ear insert which does not require utilising a mould or specialist equipment, thereby making the process less expensive and alleviating the logistical problem of bringing together the subject person and the specialist equipment or someone capable of taking a mould.

US patent application no. 2010/0296664 discusses a system for providing earpieces which utilises a non-contact 3D scanner to generate three-dimensional data for a customer's ear. Such a non-contact 3D scanner is the type of specialist equipment that introduces cost and logistical issues as discussed above. US 2010/0296664 acknowledges that there are algorithms that will try to infer three-dimensional data from a two-dimensional image of an ear, but notes that these are subject to many errors and therefore can be inaccurate and unreliable.

SUMMARY

Aspects of the invention are set out in the accompanying claims.

BRIEF DESCRIPTION OF THE DRAWINGS

Various embodiments of the present invention will now be described, by way of example, with reference to the accompanying Figures in which.

DETAILED DESCRIPTION

Embodiments of the present invention involve determining the shape of a three-dimensional insert for insertion into an ear from a two-dimensional image of the ear. This allows a custom-fitted earbud to be manufactured based on a photograph of a user's ear, for example captured with a smartphone, without requiring any three-dimensional scanning of the user's ear and thus does not require the specialised scanning equipment that such an approach would entail. Furthermore, because the user can capture the photograph with their own smartphone, there is no requirement for the user to visit a scanning location in order to determine the ear shape. This increases the convenience to the user, as well as reducing the costs of determining the ear shape and thereby reducing the costs of manufacturing custom-fitted earbuds.

The shape of the ear insert, such as an earbud, is customised for insertion into at least part of the auricle and the ear canal of the ear. In particular, the ear insert is shaped to match, within various tolerances, the shapes of at least some of the Concha Cavum, Concha Cymba, Antitragus, Tragus, Tragus Notch and the Ear Canal, and to sit over the Helices Crus.

Figure 1:
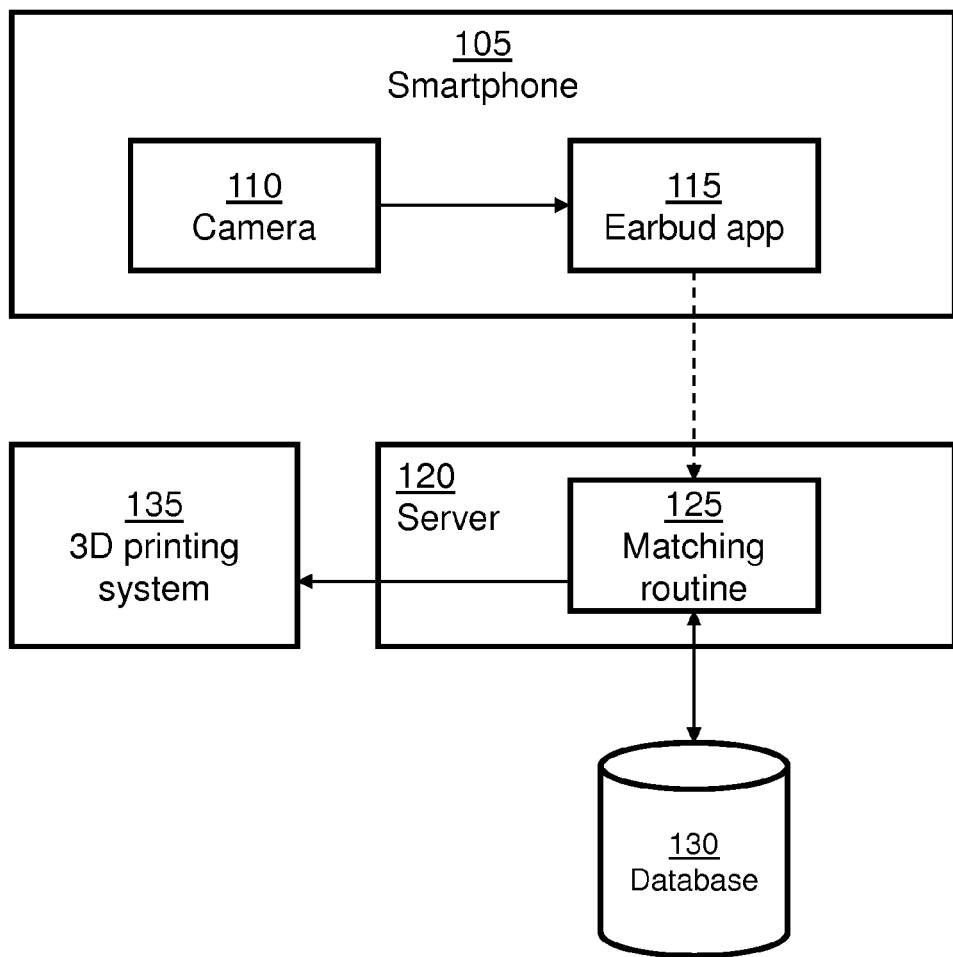
FIG. 1 shows schematically a system according to an exemplary embodiment of the present invention.

FIG. 1 shows schematically a system according to an exemplary embodiment of the present invention. The system includes a user's smartphone 105, a server 120, a database 130, and a 3D printing system 135. A smartphone is a mobile telephone that, in addition to being arranged to perform conventional audio communications, has processing circuitry that is capable of executing downloaded software applications, commonly referred to as apps.

The smartphone 105 includes, among other functionalities, a camera 110 and an earbud app 115. While the camera 110 is integral to the smartphone 105, it will be appreciated that the earbud app 115 will typically be downloaded onto the smartphone 105 from an "app store", although alternatively the earbud app 115 could be, for example a web app. In other examples, the role of the smartphone 105 may instead be performed by, for example, a desktop computer, a laptop computer, a tablet computer, a digital camera, or any other suitable device capable of capturing, processing and/or transmitting image data in accordance with the present method.

The earbud app 115 guides a user through a process for obtaining information needed for the manufacture of an earbud, and then sends the obtained information to a remote server 120. This transmission may be conducted via a wireless telecommunications network such as Wideband Code Division Multiple Access (WCDMA) or Long Term Evolution (LTE), or alternatively may be transmitted over the internet using Wi-Fi or a wired connection.

The server 120 stores matching routine 125 which matches a two-dimensional image of an ear with one of a plurality of three-dimensional ear shapes that are stored in a database 130. The three-dimensional ear shapes each include at least portions of the ear canal and/or auricle. Although the database 130 is shown as being separate from the server 120 in FIG. 1, it may alternatively be stored by the server 120. This operation of the matching routine 125, which is described in more detail below, generally involves extracting particular anatomical features and making associated measurements, such as distances between specific points on the ear, from the image and identifying the three-dimensional ear shape stored in the database 130 that corresponds to the closest match to the extracted anatomical features taking into account the various tolerances for the measurements.

In this embodiment, the server 120 is connected to a three-dimensional printing, or additive manufacturing, system 135. The three-dimensional printing system 135 produces an earbud based on the three-dimensional ear shape identified by the matching routine 125 and the requested earbud parameters. The resultant earbud is then shipped to the user. In this embodiment, the earbud is shipped to the user as part of an earphone.

The system of FIG. 1 therefore allows the user to obtain a custom-fitted earbud based only on a two-dimensional image captured with their smartphone 105, without having to perform any three-dimensional scanning of their ear. Rather than trying to infer three-dimensional data from the two-dimensional image of the ear, the system uses features extracted from the two-dimensional image to identify a match within a database of three-dimensional ear shapes.

Figure 2:
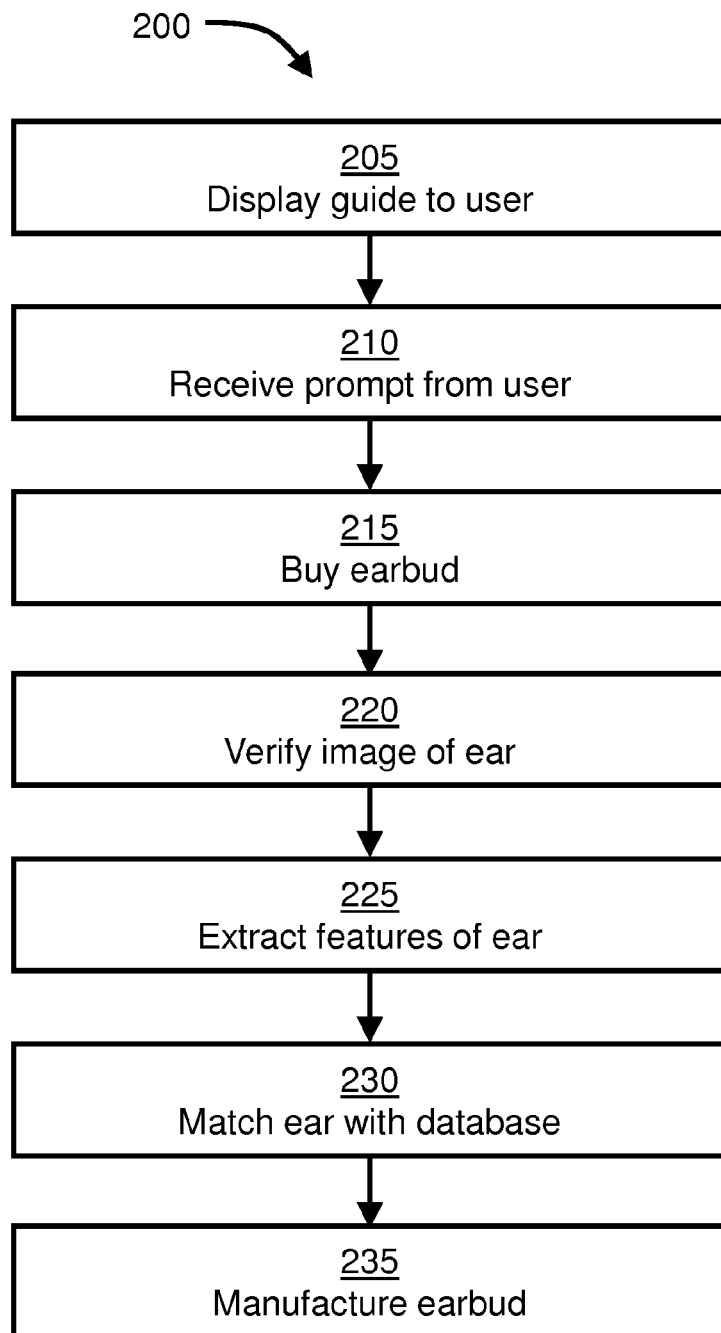
FIG. 2 shows schematically a method for manufacturing an earbud using the system of FIG. 1.

FIG. 2 shows schematically a method 200 for manufacturing an earbud according to an embodiment of the present invention. In this example, the method can be implemented within the system described above in relation to FIG. 1.

Following opening by a user, the earbud app 115 displays, at 205, a guide to the user. This guide includes prompts for the user to input all the information required for the manufacture of a custom earbud. Included in this, the earbud app 115 prompts, at 210, the user to capture an image of their ear using the camera 110. The earbud app 115 provides detailed instructions regarding how the user should capture an image of their ear. For example, the earphone app 115 informs the user of the required lighting conditions, the required distance that the camera 110 should be away from the ear, and the correct orientation of the camera 110 with respect to the ear.

In this example, absolute sizes of the extracted features are determined based on an object of known spatial dimension included in the captured image. In particular, the earbud app instructs the user to hold a coin (or other object of known size) next to their ear, based on which the scale of the captured image can be determined.

Other information obtained by the earbud app 115 includes, for example, parameters of the desired earbuds such as colour, style, cordless vs. corded, speaker specifications or aesthetic design features, and payment details.

The earbud app 115 then prompts, at 215, the user to confirm the purchase of the earbud. Following this confirmation, the earbud app 115 transmits the obtained information to the server 120.

The server 120 verifies, at 220, that the quality of the image of the ear is suitable for the matching operation that is described in more detail below. Examples of quality criteria include: a lack of occlusion of the ear for example by the user's hair, sufficient lighting of the image, the entire ear being visible in the image, and the ear being parallel with the focal plane of the camera. If the quality is insufficient, then the server 120 sends a signal to the earbud app 115 to request a replacement image. In other embodiments, the verification is performed by the earbud app.

The server 120 then extracts, at 225, from the two-dimensional image of the ear features of the ear that are representative of the three-dimensional ear shape. As described in more detail below, these features are typically measurements of anatomical features of the ear. As the anatomical features must be visible in the two-dimensional image, they are typically features of the external auricle of the ear.

The server 120 then matches, at 230, the ear with one of a plurality of pre-stored three-dimensional ear shapes, stored in a database. As described in more detail below, the matching comprises determining which pre-stored shape of the plurality most closely matches the captured two-dimensional image of the ear, based on the aforementioned extracted features, taking into account the various tolerances for the measurements.

In particular, in this embodiment each of the pre-stored three-dimensional shapes is stored in association with a two-dimensional projection of the three-dimensional shape and biometric features derived from that two-dimensional projection. By comparing the biometric features extracted from the received two-dimensional image with the biometric features associated with each pre-stored three-dimensional shape, the closest match can be determined.

An earbud is then manufactured, at 235, according to the three-dimensional ear shape identified in step 230. This earbud is then shipped to the user.

Figure 3:
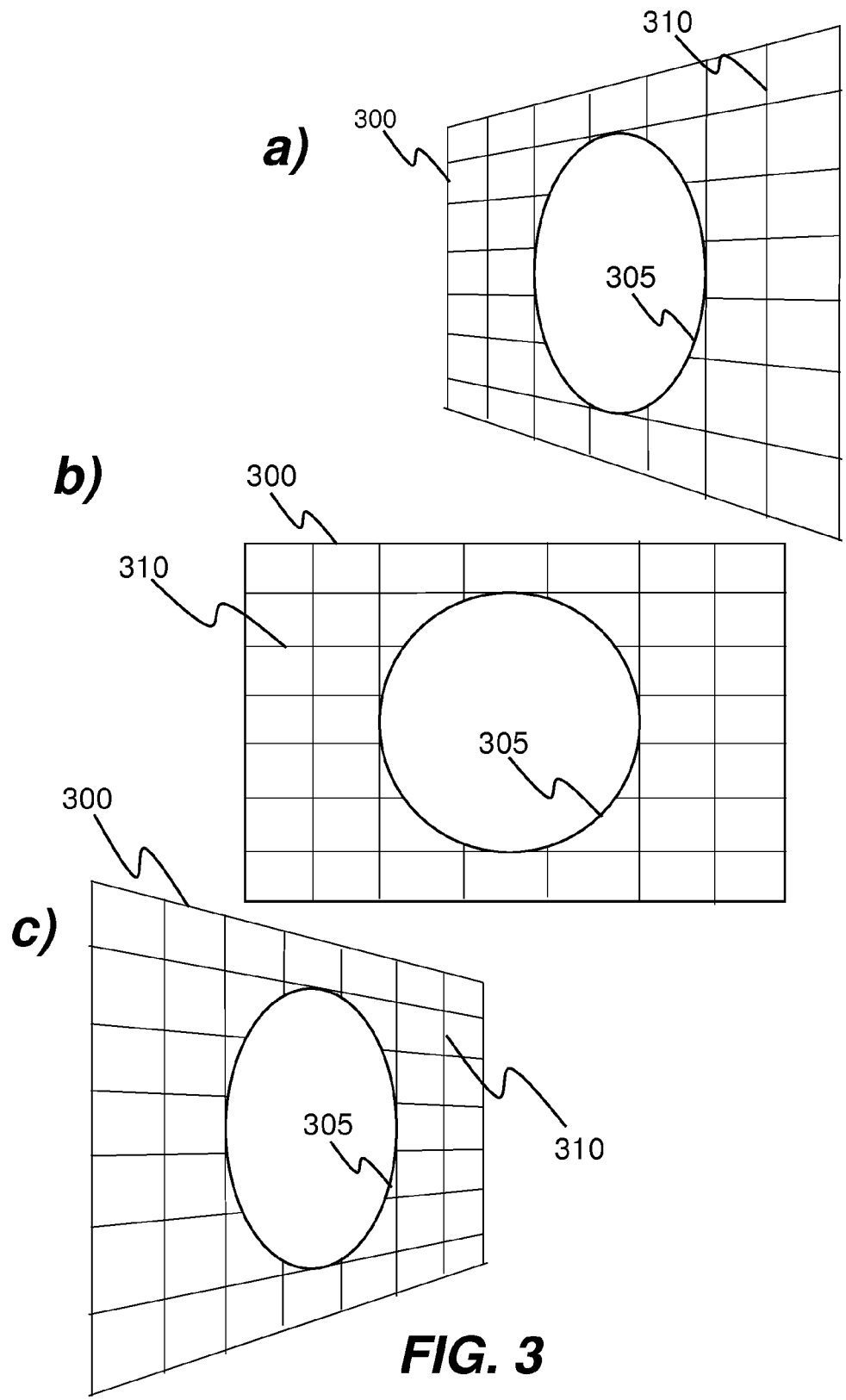
FIG. 3 shows a fitting card at three different orientations.

In the example described above, the earbud app 115 instructs the user to include an object of known spatial dimension in the captured image of the ear, from which the absolute sizes of the extracted features are determined. In another example, a system for determining a shape of an insert for insertion into an ear includes, in addition to the components of FIG. 1, a fitting card for determining a scaling and orientation of a captured image of an ear. FIGS. 3a, b, and c show examples of a fitting card 300 at three different orientations. The fitting card 300 includes a central hole 305 through which a user can extend his or her ear, or through which the user's ear is visible when the fitting card is placed against the side of the user's head. The fitting card 300 also includes gridlines 310, which in this example are evenly spaced and mutually perpendicular, thus forming a rectilinear grid. In other examples, a fitting card may include additional or alternative features to those shown in FIG. 3, or may omit certain features such as the gridlines 310.

Figure 4:
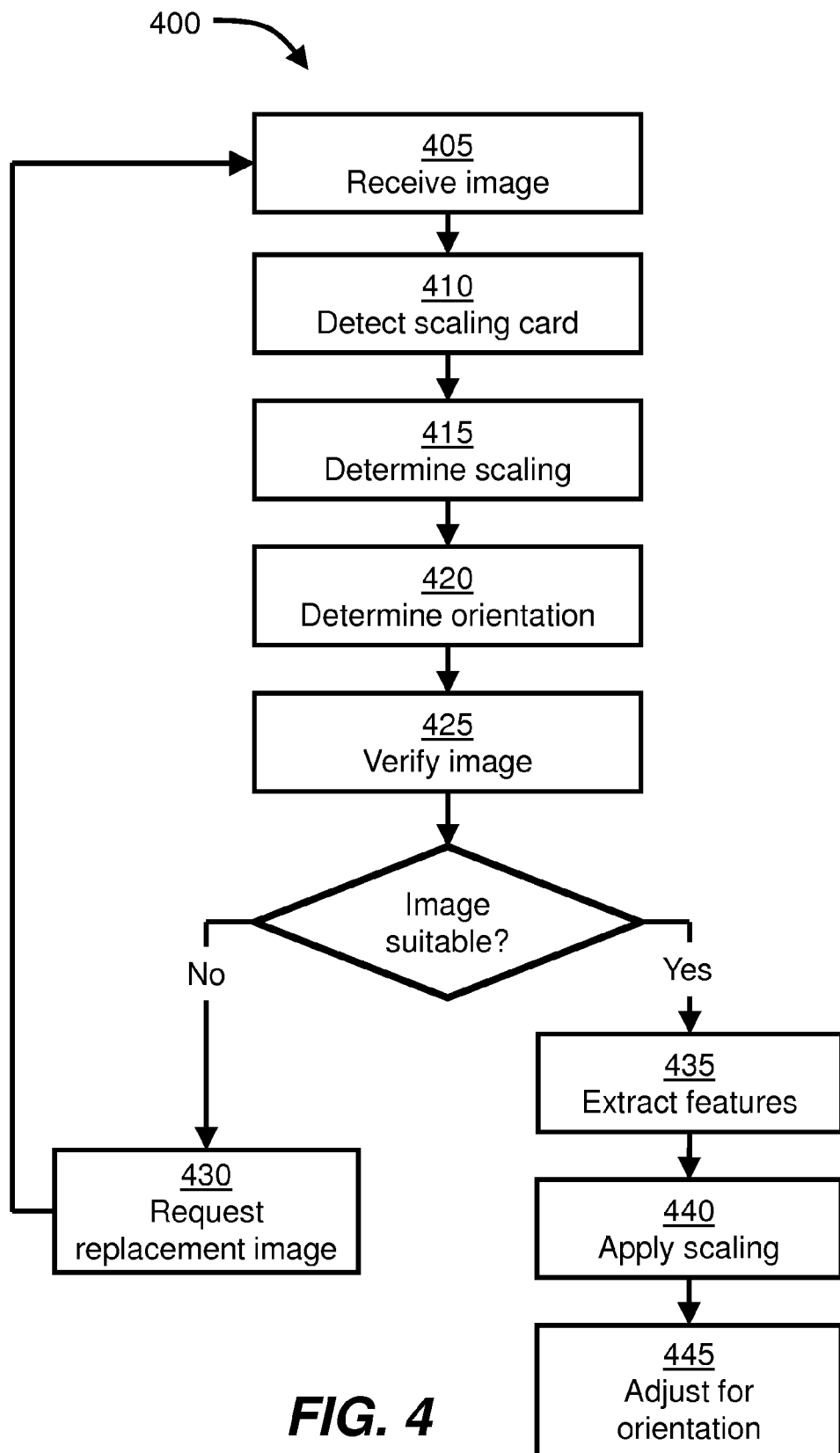
FIG. 4 shows schematically a method for extracting features from a two-dimensional image.

FIG. 4 shows schematically a method 400 for processing an image of an ear in accordance with an embodiment of the present invention. Prior to the method of FIG. 4 being performed, the earbud app 115 running on the smartphone 105 instructs the user to place the fitting card 300 against the side of his or her head, with his or her ear extending through the hole. After capturing an image of the ear of the user with the fitting card in place, the smartphone 105 sends the captured image to the server 120. The server 120 receives, at 405, the captured image from the smartphone 105.

The server 120 detects, at 410, the fitting card 300 in the received image. In this example, the fitting card 300 is detected using standard image processing techniques to detect the gridlines 310. The inclusion of gridlines and/or other distinctive features on the fitting card 300 allows the server 120 to detect the fitting card 300 reliably. In other examples, an object detection routine, for example using a trained neural network or other machine learning algorithm, may be used to detect a fitting card.

The server 120 determines, at 415, a scaling of the image using the detected fitting card 300. In this example, the server 120 uses the gridlines 310 to determine the scaling of the image, but in other examples, other features of the fitting card 300 may be used, for example the size of the hole 305 or the overall size of the fitting card 300.

The server 120 determines, at 420, an orientation of the fitting card 300 using the gridlines 310. In this example, determining the orientation involves measuring sizes of the regions delimited by the detected gridlines 310. For example, in the orientation of FIG. 3a, the regions delimited by gridlines 310 towards the left of the fitting card 300 appear smaller that the regions delimited by gridlines 310 towards the right of the fitting card 300. In the orientation of FIG. 3b, the regions delimited by gridlines 310 appear approximately equal in size over the extent of the fitting card 300. In the orientation of FIG. 3c, the regions delimited by gridlines 310 towards the left of the fitting card 300 appear larger that the regions delimited by gridlines 310 towards the right of the fitting card 300. In other examples, the orientation of the fitting card 300 may be determined by measuring angles of the gridlines 310, and/or by measuring relative spacings of the gridlines 310. The determined orientation may be represented as one or more numbers corresponding to one or more angles, including for example an angle of the fitting card around an axis parallel to the vertical gridlines 310 of the fitting card. In a further example, the orientation of the fitting card is classified as "right", corresponding to an orientation as shown in FIG. 3a, "straight", corresponding to an orientation as shown in FIG. 3b, and "left", corresponding to an orientation as shown in FIG. 3c.

In one example, the determined orientation is represented as three numbers, corresponding to angles of rotation of the fitting card about three mutually perpendicular axes (for example, a first axis passing through the camera 110 and the centre of the hole 305, a second axis perpendicular to the first axis and having a predetermined rotation about the first axis with respect to the camera 110, and a third axis perpendicular to the first axis and the second axis). It will be appreciated that the scaling and orientation may be determined in a single step.

Having determined the scaling and orientation, the server 120 verifies, at 425, whether the image is suitable for matching. In this example, verifying that the image is suitable for matching includes determining that the scaling of the image is within a predetermined acceptable range, and accordingly that the camera 110 was neither too far from, nor too near to, the ear of the user at the time that the image was captured. Verifying that the image is suitable for matching further includes determining that the orientation of the fitting card 300 is acceptable. For example, where the orientation is determined as one or more numbers corresponding to one or more angles, each of the angles must be within a respective predetermined acceptable range for the server 120 to verify that the image is suitable for matching. In a specific example, for an image of a left ear of a user, the orientations of the fitting card 300 shown in FIG. 3a and FIG. 3b are determined to be acceptable, whereas the orientation of the fitting card 300 shown in FIG. 3c is determined not to be acceptable. For a left ear, the "left" orientation of FIG. 3c corresponds to the camera 110 being in a position in front of the ear of the user, from which certain features within the ear may be hidden. By contrast, the "right" orientation of FIG. 3a corresponds to the camera 110 being in a position behind the ear of the user, from which the features may be visible.

If the image is not verified to be suitable for matching, the server 120 sends a signal, at 430, to the earbud app 115 to request a replacement image.

If the image is verified to be suitable for matching, the server 120 extracts, at 435, the features of the ear that are representative of the three-dimensional ear shape, as described in more detail hereafter. In this example, the extracted features of the ear are based on a set of detected anatomical points.

The server applies, at 440, the scaling determined at 415 to the extracted features. In this example, applying the scaling involves converting distances between the determined anatomical points from pixels to millimetres.

The server adjusts, at 445, the extracted features to take into account the orientation of the fitting card 300 determined at 445. For example, depending on a determined angle of the fitting card 300 about a vertical axis, the extracted features may be scaled in the horizontal direction according to a predetermined rule, such that for any determined angle, the extracted features can be meaningfully matched with corresponding features associated with a database of three-dimensional ear shapes.

In other examples, the fitting card 300 may be omitted, and adjusting the extracted features to take account of the orientation of the image may be performed using image registration techniques, for example using a neural network or other supervised learning algorithm trained using a set of images of ears captured at different, known, orientations. In other examples, all or part the method of FIG. 4 may be performed by the smartphone 105.

In the method of FIG. 4, the server 120 processes an image captured by the camera 110 to extract features for a matching operation. In other examples, the smartphone 105 may determine the distance to, and/or orientation of, the user's ear with respect to the camera in real time or near real time, such that the earbud app 115 may automatically detect when the user's ear is at an acceptable distance and/or orientation, and automatically capture an image of the ear or signal to the user to capture an image of the ear. In one example, the distance and orientation are detected using real time object detection to identify a fitting card such as fitting card 300.

As noted above, the operation for matching an image of a user's ear with one of a plurality of pre-stored three-dimensional ear shapes is based on anatomical features of the user's ear. The dimensions of the anatomical features are representative of the three-dimensional shape of at least part of the user's ear, for example including a part of the auricle and a part of the ear canal. Some examples of such features will now be described with reference to FIG. 5. FIG. 5 shows several images of ears 505-535, with example features shown in black lines.

One such feature, shown in image 505, is a curvature of the helix of the ear, for example expressed as the relative length of the various lines shown in the image 505, each of which run from a predefined point on the *Fossa triangularis* of the ear to various points on the helix of the ear.

Other features include measurements, for example side lengths and/or areas, of various triangles defined by predefined anatomical points of the ear. Examples of such points include points on the helix, *Fossa triangularis*, lobe, intertragic notch, antihelix, tragus and antitragus. Images 510-535 show various such triangles. Specifically:

image 510 shows a triangle formed by points on the helix, *Fossa triangularis* and lobe;

image 515 shows a triangle formed by points on the *Fossa triangularis*, intertragic notch and antihelix;

image 520 shows a triangle formed by points on the antihelix, *Fossa triangularis* and tragus;

image 525 shows a triangle formed by points on the tragus, antitragus and intertragic notch;

image 530 shows a triangle formed by points on the *Fossa triangularis*, antihelix and tragus; and image 535 shows a triangle formed by points on the tragus, intertragic notch and antihelix.

The points are identified in the image using a machine learning classification algorithm, following which measurements of triangles such as those described above are determined. The classification algorithm is trained on a set of images of ears for which the above-mentioned points are known.

Figure 5A:
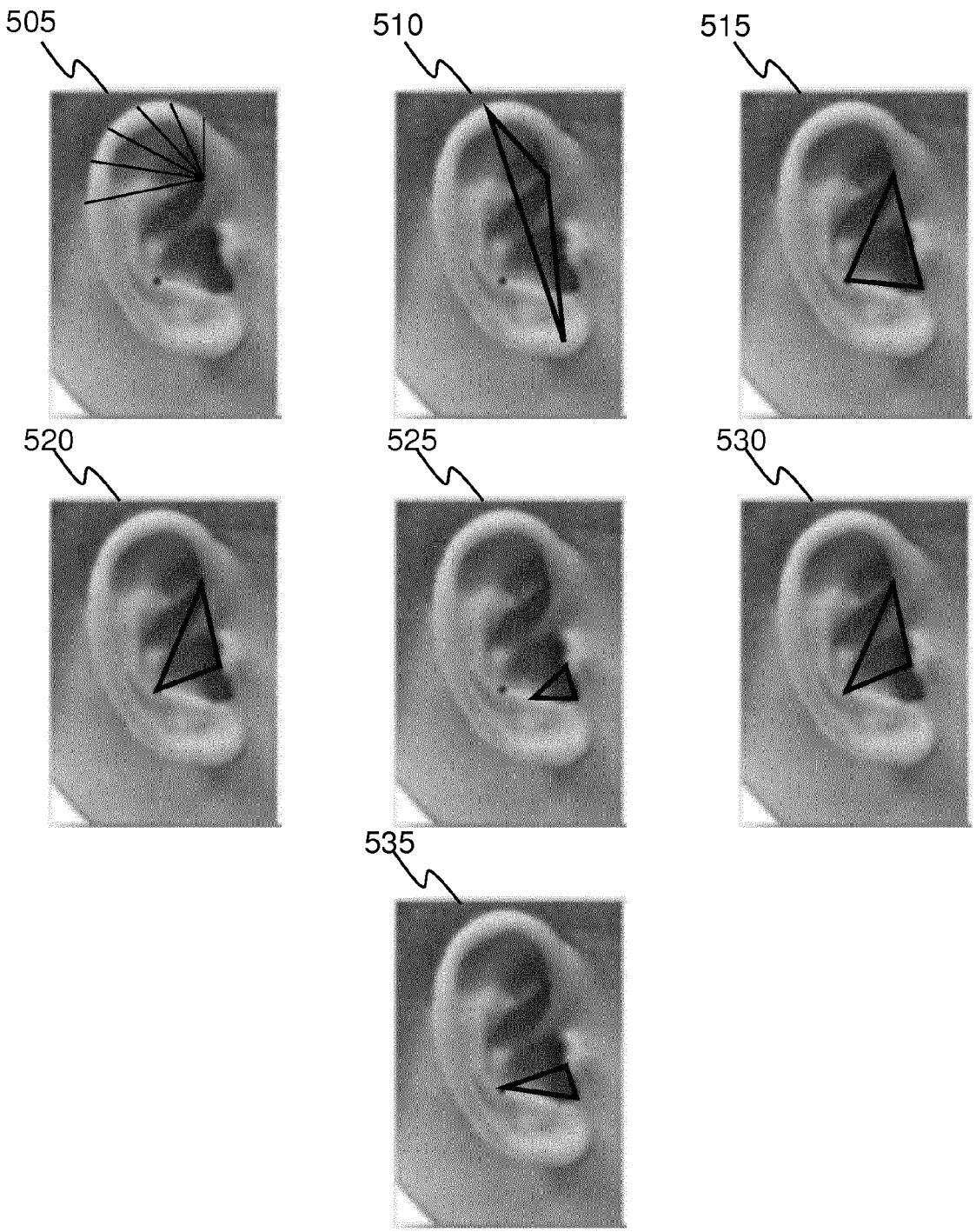
FIG. 5A shows images of an ear with biometric features that are measured by the system of FIG. 1 indicated.
Figure 5B:
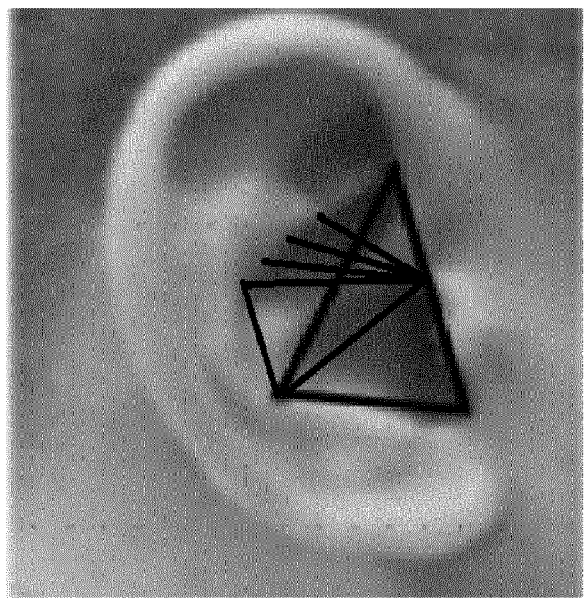
FIG. 5B shows an image of an ear with a set of biometric features indicated.

FIG. 5B shows an example of a set of anatomical features representative of a three-dimensional shape of at least part of a user's ear. In this example, the set of features includes a triangle formed by points on the *Fossa triangularis*, intertragic notch and antihelix, corresponding to the feature described above with reference to image 515. The set of features further includes the shape of the antihelix, which is characterised by a set of of lines extending between a point on the tragus and five respective points on the antihelix, and a further line extending between the two lowest of the five respective points. The features shown in FIG. 5B are based on eight predefined anatomical points, though it is envisaged that alternative sets of features may be used in some embodiments, and these alternative sets may be based on more or fewer than eight predefined anatomical points.

Figure 6:
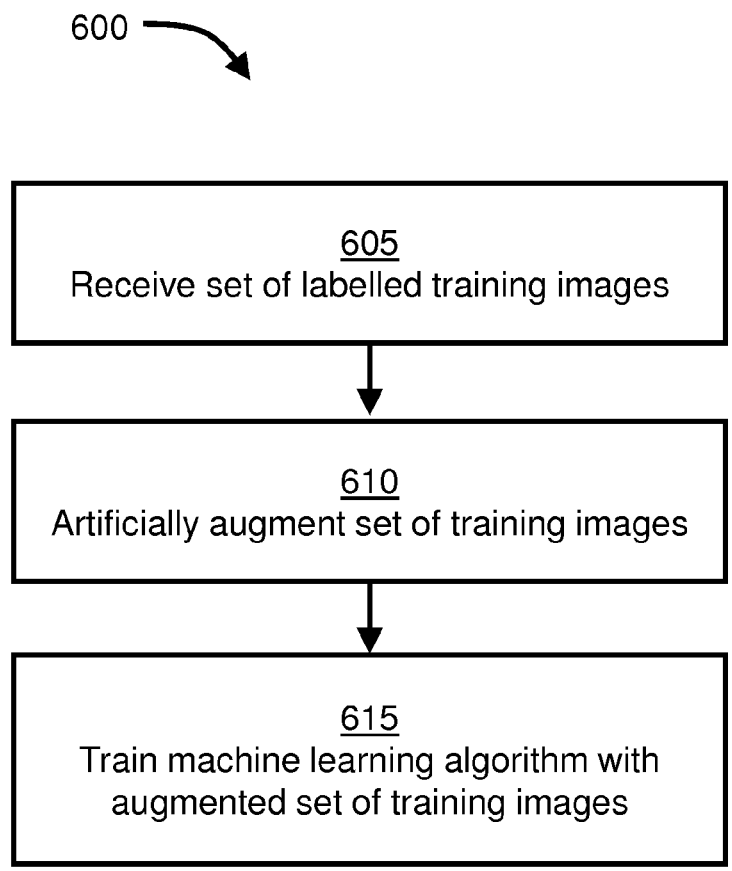
FIG. 6 shows schematically a method of training a machine learning classification algorithm.

FIG. 6 shows schematically an exemplary method 600 performed by a computer system to train a machine learning classification algorithm for detecting anatomical points of an ear.

The computer system receives, at 605, a set of training images in which the anatomical points have been labelled by hand. In this example, labelling the anatomical points by hand involves a human user identifying by eye each of the anatomical points within the image and using a cursor to tag and label the identified points accordingly. Data indicative of the co-ordinates of the labelled points within each training image are stored as an additional data layer in association with that training image. The set of training images may be captured at a variety of different orientations and in a variety of different lighting conditions.

The computer system artificially augments, at 610, the set of training images based on, for example, contrast, brightness, scale, and orientation. Augmenting the set of training images involves generating additional training images, referred to as artificial training images, by processing the original training images received at 605. Augmenting the set of training images based on contrast and/or brightness includes varying the contrast and/or brightness of the images in the original set to generate artificial training images that correspond to the original images but have varying levels of contrast and/or brightness. Augmenting the set of training images based on scale includes scaling the images by predetermined increments to generate artificial training images that correspond to the original images but at different scales. Augmenting the set of training images based on orientation includes, for example, rotating the images about an axis perpendicular to the planes of the images, to generate artificial training images that correspond to the original1 images, rotated by different angles. The computer system trains, at 615, the machine learning classification algorithm with the artificially augmented set of training images. In a specific example, the machine learning classification algorithm includes a convolutional neural network (CNN), and training the machine learning classification algorithm involves passing the artificially augmented set of training images through the CNN and performing backpropagation followed by gradient descent to update parameters of the CNN. Training the machine learning classification algorithm with the artificially augmented set of training images improves the ability of the machine learning classification algorithm to classify images captured in different lighting conditions and at different angles and distances. Furthermore, the earbud app 115 may be installed on a variety of different smartphones, which may have different cameras and/or camera configurations from each other, and training the machine learning classification algorithm with the artificially augmented set of training images improves the reliability of the algorithm when applied to images captured by a range of different smartphones.

In addition to processing an image captured by the smartphone 105 to extract biometric features of a user's ear, in the present embodiment the server 120 performs a further machine learning classification routine to identify one or more predetermined anomalous ear shape features. One such anomalous ear shape feature is a closed cymba. Another such anomalous ear shape feature is a pronounced ridge in the ear, for example corresponding to a pronounced crus helix. It has been observed that such anomalous ear shape features can lead to poor fitting and/or comfort of an earbud manufactured according the present method. Accordingly, if one or more anomalous ear shape features is detected, the server 120 sends a signal to the smartphone 105, causing the smartphone 105 to inform the user that the method of determining the user's three-dimensional ear shape has been unsuccessful, and that specialist equipment is required for determining a shape of an ear insert for the user.

In the present embodiment, indications of the above-described features are stored for each of the pre-stored three-dimensional ear shapes, such that each measurement is stored for each pre-stored three-dimensional ear shape. As described in more detail below, an initial set of the pre-stored three-dimensional ear shapes may be produced by three-dimensionally scanning ears. The measurements may be extracted directly from the scans or, alternatively, from two-dimensional images captured in addition to the scans.

The matching operation referred to above includes comparing the measured features from the captured ear image with the biometric features stored for each pre-stored three-dimensional ear shape. This includes determining whether some of the measurements fall within preset tolerances. For example, particular measurements corresponding to earbud dimensions that are critical for user comfort may have tighter preset tolerances than other dimensions that are less critical for user comfort. As a particular example, the dimensions of the cymba of the ear have a high impact on the comfort of an earbud. Tighter preset tolerances are accordingly applied to measurements that are more closely correlated with the dimensions of the cymba. Subject to constraints based on tolerances as described above, the captured ear image is matched with the three-dimensional ear shape for which the features correspond most closely with the measured features from the captured ear image. This matched three-dimensional ear shape is deemed to be the closest match, of the pre-stored three-dimensional ear shapes, to the ear of which the image was captured. A pre-stored three-dimensional shape may be rejected if one or more of the features of the pre-stored shape falls outside of preset tolerances, even if that pre-stored shape would otherwise have been deemed the closest match.

Figure 7:
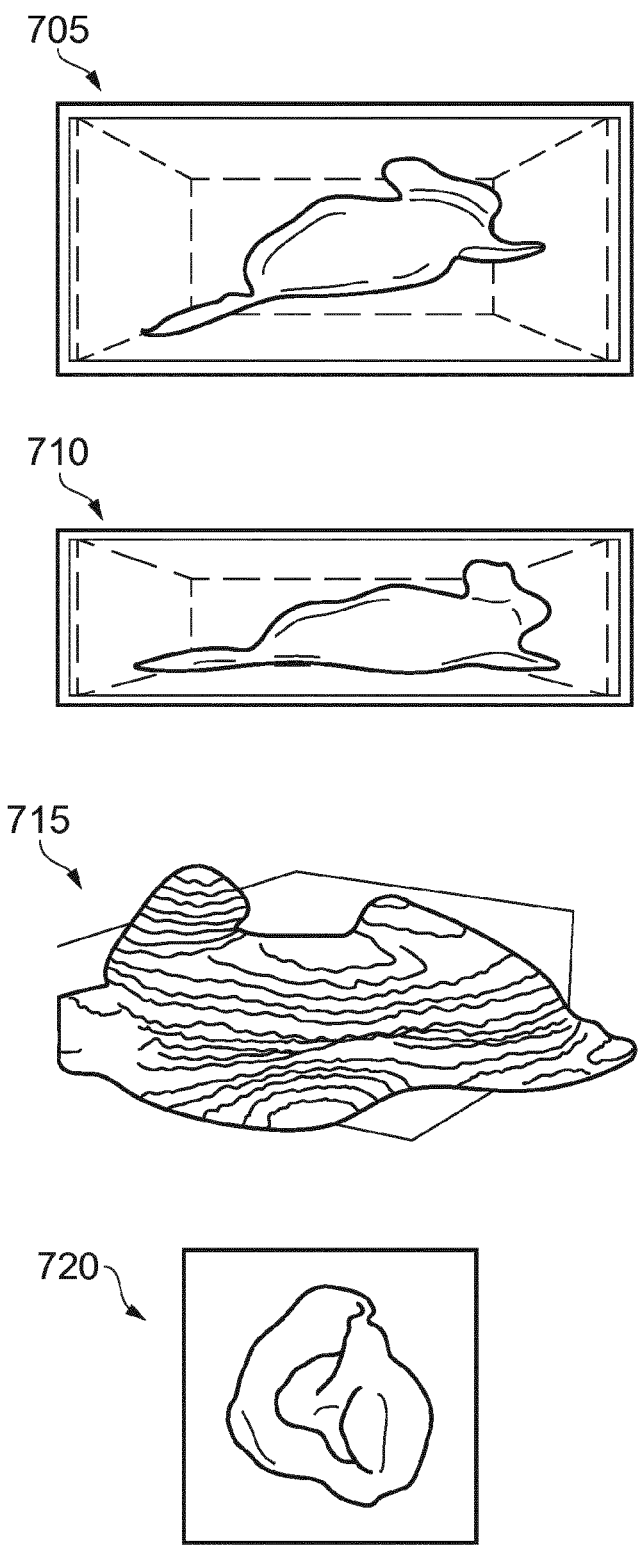
FIG. 7 illustrates three-dimensional data for an ear shape.

A method for obtaining the pre-stored three-dimensional ear shapes, and determining the relevant features thereof, will now be described with reference to FIG. 7.

In order to obtain an initial set of three-dimensional ear shape, an ear is three-dimensionally scanned to produce data 705 representing the three-dimensional ear shape. For example, a user may be incentivised to visit a scanning kiosk by offering a premium service, or a price discount, relative to obtaining custom-fitted earbuds based on a two-dimensional image.

The scanned ear shape 705 is then rotated in order to produce a rotated version 710 that is oriented with an x-y plane. Rotating scanned shapes to the same x-y plane in this manner allows all scanned ear shapes to be consistently analysed.

Cross sectional layers 715 are then determined, corresponding to a "scanning" of a horizontal plane down the rotated ear shape 710. The combined cross sectional layers 415 thereby provide a systematic description of the geometry of at least part of the three-dimensional auricle and ear canal. The cross sectional layers 715 may be used by the 3D printing system 135 to perform additive manufacturing of an ear insert, though in other examples the step of determining cross sectional layers may be omitted, and a three-dimensional ear shape may be transmitted directly to a 3D printing system for manufacture of a corresponding ear insert.

The rotated ear shape 710 is used to determine a two-dimensional projection 720 of the three-dimensional ear shape. The two-dimensional projection 720 is a two-dimensional image corresponding to a view of the ear canal in which features representative of the shape of the ear are visible. In the present example, the two-dimensional projection 720 is a greyscale image.

The two-dimensional projection 720 is used for matching with a two-dimensional image of a user's ear, for example captured using the method 400 of FIG. 4. In order to use the two-dimensional projection 720 for matching, anatomical features such as those described above with reference to FIG. 5A are extracted from the two-dimensional projection 720. In this example, the anatomical features correspond to those described above with reference to FIG. 5A, and are based on predefined anatomical points, which are identified in the two-dimensional projection 720 using a machine learning classification algorithm. The machine learning classification algorithm is trained using a similar routine to that described above with regard to FIG. 6, with a training set being augmented based on contrast and orientation.

In the present embodiment, the two-dimensional projection is stored in association with the three-dimensional data. When a given ear shape is matched to be used to manufacture an earbud using the corresponding biometric features derived from a two-dimensional projection, the associated three-dimensional data can be used to define the shape of the earbud to be produced.

In the example described above, two-dimensional anatomical features corresponding to a pre-stored three-dimensional ear shape are extracted from a two-dimensional projection of the three-dimensional ear shape. In other examples, anatomical features may be extracted directly from a three-dimensional ear shape, without first generating a two-dimensional projection of the three-dimensional ear shape. In addition to the three-dimensional scanning of an ear discussed above, alternative methods may be used to obtain the three-dimensional ear shapes, for example scanning a physical mould of an ear. The method of extracting the anatomical features described above is agnostic to the method by which the ear shapes are obtained, allowing an extensive database of pre-stored ear shapes and associated anatomical features to be built up from a range of sources.

For each pre-stored three-dimensional ear shape obtained as described above, multiple scaled versions may also be stored. For example, versions scaled uniformly by increments of 5% or 10% may be stored. In order to obtain scaled versions, a three-dimensional scaling algorithm is applied to the three-dimensional data 705, and the method described with reference to FIG. 7 is applied to generate corresponding two-dimensional projections and corresponding biometric features. Storing scaled versions of the three-dimensional ear shapes, along with the corresponding biometric features, increases the chances of a match being obtained during the matching operation.

As an alternative to extracting features from a two-dimensional projection of the three-dimensional ear shape, in some embodiments an actual two-dimensional picture of the ear is stored in association with the three-dimensional data and the biometric features for that ear are measured using that two-dimensional picture. When a given ear shape is matched to be used to manufacture an earbud using the corresponding biometric features derived from a two-dimensional picture, the associated three-dimensional data can be used to define the shape of the earbud to be produced. A system for both producing a database of pre-stored ear shapes, and matching two-dimensional images of ears to ear shapes in that database, will now be described with reference to FIG. 8.

A scanning centre 805, for example a kiosk, can be visited by a user in order to receive a three-dimensional scan of their ears. As noted above, a user may be incentivised to use the scanning centre 805 by offering a premium service, such as additional earbud features, for using the scanning centre 805. Alternatively or additionally, a price discount may be offered to users who use the scanning centre 805. The user's ears are three-dimensionally scanned as described above in relation to FIG. 7, and the resulting ear shapes, along with details of the measurements of the features such as those described above in relation to FIG. 5A, are stored in a database 810. Depending on how the three-dimensional ear shapes are obtained, some of the three-dimensional ear shapes may be stored in association with a two-dimensional projection derived from the three-dimensional shape, while other three-dimensional ear shapes may be stored in association with a two-dimensional picture of the ear captured alongside the three-dimensional shape. In addition to being stored in the database 810, the scanned three-dimensional ear shapes are transmitted to a manufacturing centre 815 which produces custom-fitted earbuds for the user, for example by three-dimensional printing.

Over time, as users use the scanning centre 805, the database of 810 is expanded to include a large number of three-dimensional ear shapes.

A different user uses a smartphone 820 to capture images of their ears. These images are transmitted to a server 825 which matches the images with three-dimensional ear shapes stored in the database 810, as described in more detail above. The server 825 then transmits details of the matched three-dimensional ear shapes to the manufacturing centre 815, which produces earbuds for the user according to the matched three-dimensional ear shapes.

If the matching is unsuccessful, because none of the ear shapes stored in the database 810 provide a suitable match to the captured ear images, the server 825 instructs the smartphone 820 to request that the user visit the scanning centre 805 to receive a three-dimensional scan of their ears, with the resulting three-dimensional ear shapes, along with details of the measurements of the features such as those described above in relation to FIG. 5A, being stored in a database 810. The user may be incentivised to do this for example by offering a discounted price. If the matching is successful, but the resulting manufactured earbuds do not adequately fit the ears of the user, then the user can also visit the scanning centre 805 to receive a three-dimensional scan of their ears, with the resulting three-dimensional ear shapes, along with details of the measurements of the features such as those described above in relation to FIG. 5A, being stored in a database 810. It will be appreciated that as the number of ear shapes stored by the database increases, the likelihood of a successful match and a successful fit increases.

Figure 9:
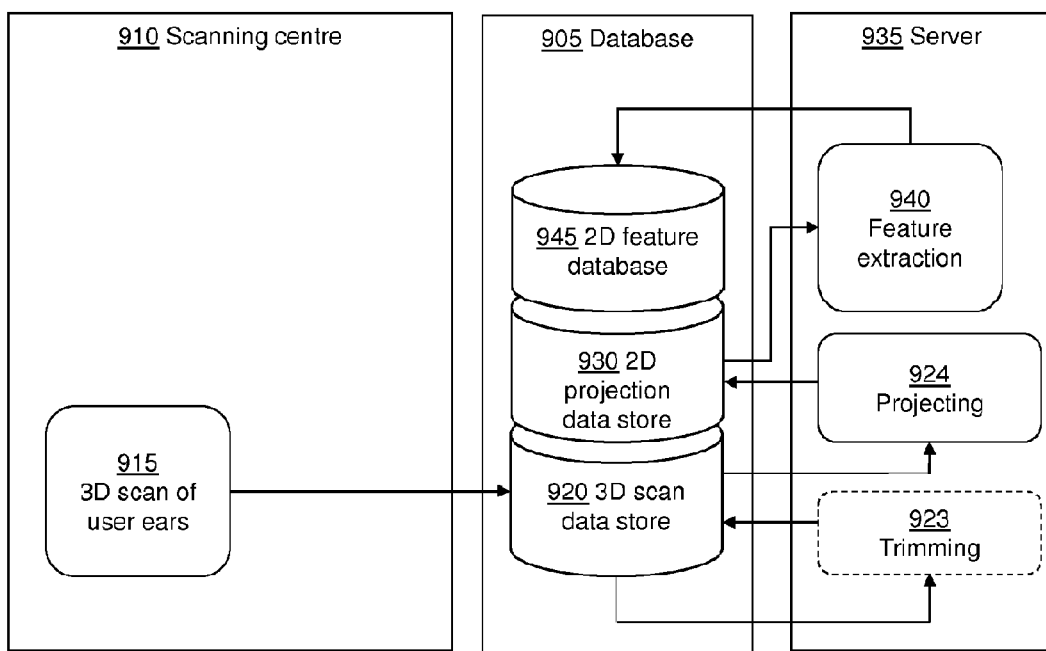
FIG. 9 shows schematically a system for populating a database with three-dimensional ear shapes.

FIG. 9 shows schematically a system for populating a database 905 with three-dimensional ear shapes.

Figure 8:
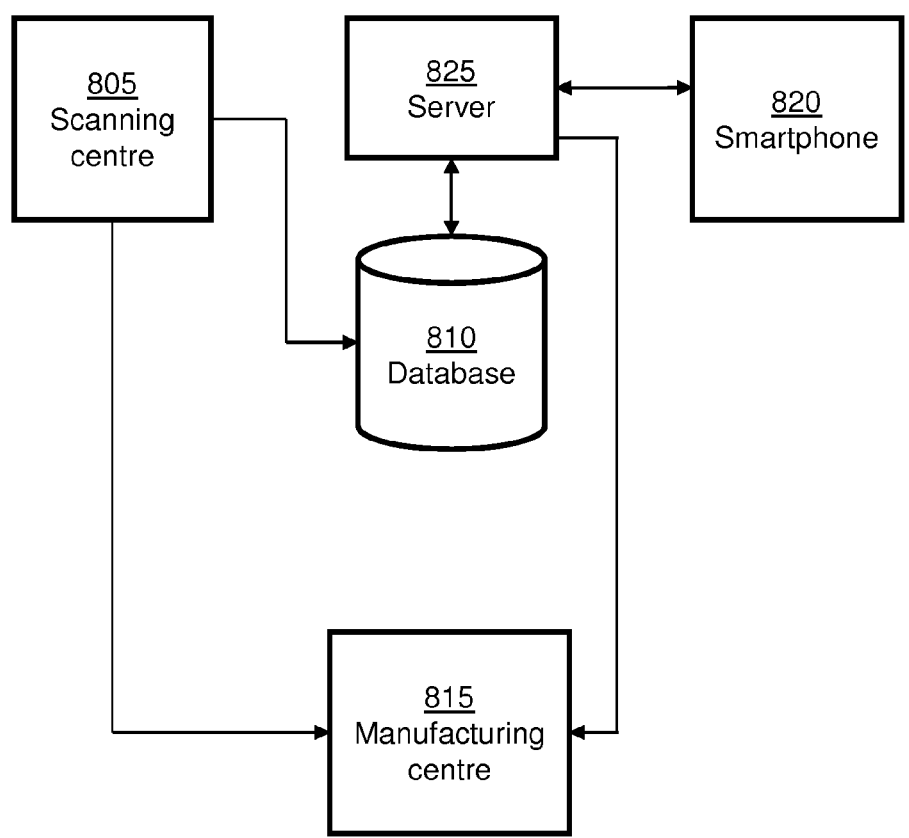
FIG. 8 shows schematically a system for producing a database of pre-stored ear shapes, and for matching two-dimensional images of ears to ear shapes in that database.

A user visits a scanning centre 910, similar to the scanning centre 805 of FIG. 5A8. Three-dimensional scans 915 are produced of the user's ears. The scans 925 are stored in a three-dimensional scan data store 920 of the database 905. A trimming module 923 of a server 935 optionally performs a "trimming" operation, in which the three-dimensional ear shapes are modified in order to be used to manufacture an earbud. For example, the surface may be smoothed, and bumps or other features that are not desired to be in the manufactured earbud may be "trimmed", or removed. It is noted that this operation may alternatively be performed at the scanning centre 910, and for certain types of scan, may not be necessary at all.

A projecting module 924 of the server 935 performs a projecting operation, as described above, to generate two-dimensional projections of the stored three-dimensional ear shapes. The projecting operation includes orienting the image as described above with reference to FIG. 7. The two-dimensional projections are stored in a two-dimensional projection store of the database 905.

The server 935 extracts two-dimensional features from the two-dimensional projections in a feature extraction module 940. These features include measurements defined by anatomical points of the ear, such as those described above in relation to FIG. 5A. The extracted features are stored in a two-dimensional feature database 945 of the database 905, such that they can be associated with their corresponding three-dimensional ear shapes stored in the three-dimensional scan data store 920.

The server 935 later receives captured two-dimensional images of the ears of a different user, for example via the smartphone 820 of FIG. 8, and matches these images with the extracted features. When a match is determined, the corresponding three-dimensional ear shape is identified and transmitted to a manufacturing centre such as the manufacturing centre 815 of FIG. 8, based on which the manufacturing centre manufactures earbuds.

Figure 10:
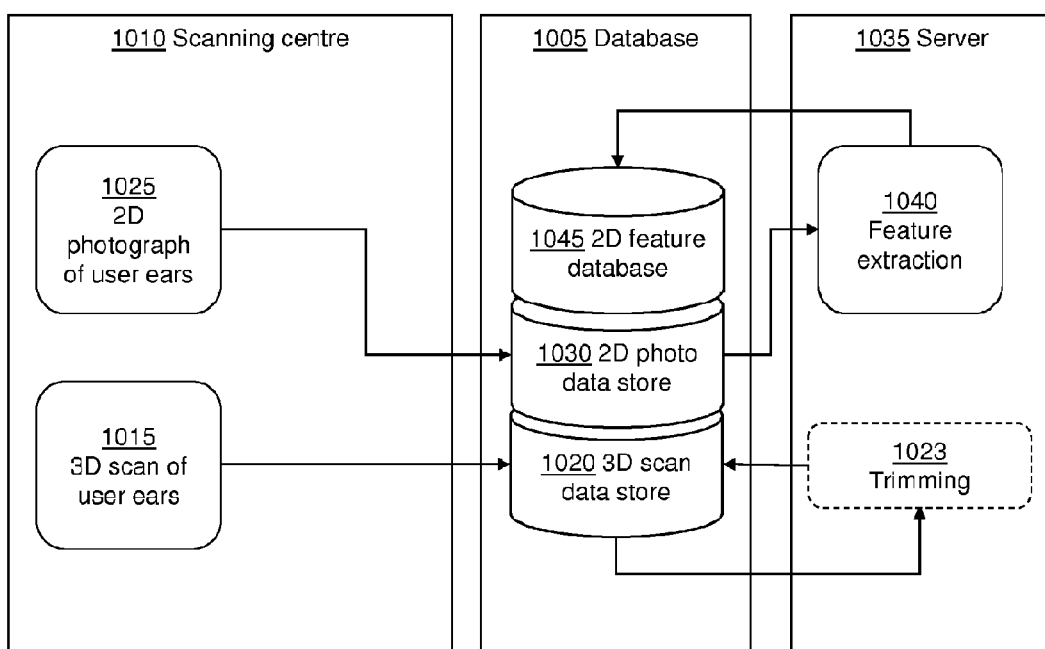
FIG. 10 shows schematically a further system for populating a database with three-dimensional ear shapes.

FIG. 10 shows schematically an alternative system for populating a database 1005 with three-dimensional ear shapes. The system of FIG. 10 is equivalent to the system of FIG. 9, except that in the scanning centre 1010 of FIG. 10, two-dimensional photographs 1025 are also captured of the users' ears, and stored in a two-dimensional photograph data store 1030 of the database 1005. The server 1035 extracts two-dimensional features from the two-dimensional photographs in a feature extraction module 1040. In this embodiment, the server 1035 does not include a projecting module. Further embodiments may include a combination of features of FIGS. 9 and 10, such that some images are stored alongside two-dimensional photographs, and other images are stored alongside two-dimensional projections.

Figure 11:
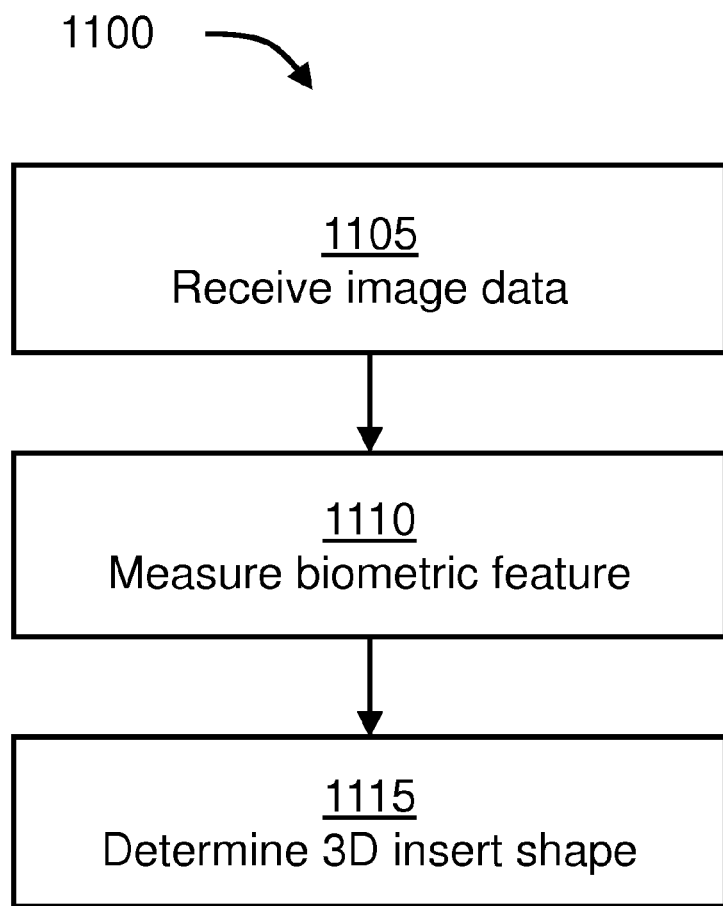
FIG. 11 is a flow chart illustrating a method of determining a three-dimensional shape for an insert to be inserted into an ear.

FIG. 11 shows schematically a method 1100 of determining a three-dimensional ear shape for an ear.

The method 1100 has a step 1105 of receiving image data corresponding to a two-dimensional image of the ear. As described in more detail below, the two-dimensional image can be captured by a user, for example with a smartphone or other device with a camera.

The method 1100 has a step 1110 of processing the image data to measure at least one biometric feature of the ear. As described in more detail below, these biometric features are particular measurable features, visible in the two-dimensional image, that are representative of the three-dimensional ear shape.

The method 1100 has a step 1115 of determining the three-dimensional ear shape for the ear by matching the above-mentioned biometric features with one of a plurality of pre-stored three-dimensional ear shapes. In this manner, the biometric features are matched with the pre-stored ear shapes in order to identify a particular pre-stored shape that corresponds most closely to the captured two-dimensional image. The identified pre-stored three-dimensional shape can then be assumed to describe the three-dimensional shape of the ear. A custom-fitted earbud can then be manufactured according to the identified pre-stored three-dimensional shape.

Figure 12:
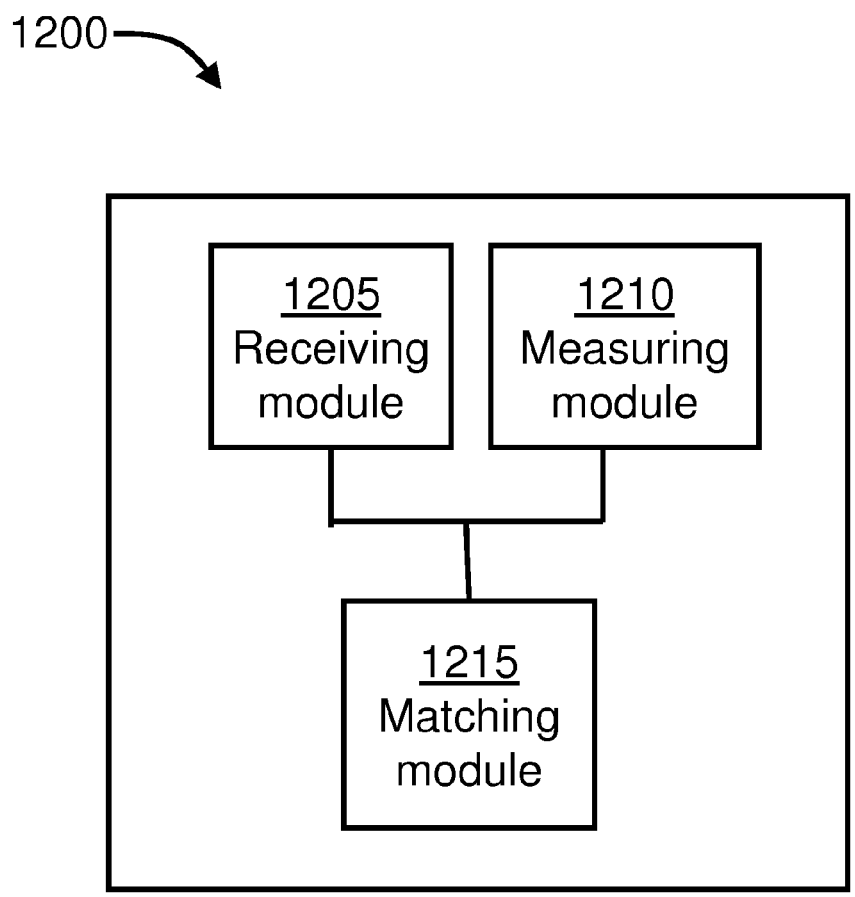
FIG. 12 shows schematically an apparatus for determining a three-dimensional shape for an insert to be inserted into an ear.

FIG. 12 shows schematically an apparatus 1200 for determining a three-dimensional ear shape for an ear, for example my implementing the method described above in relation to FIG. 11. The apparatus 1200 may for example be a server. The apparatus 1200 has a receiving module 1205 configured to receive image data corresponding to a two-dimensional image of the ear, for example from a user's smartphone as described above.

The apparatus 1200 has a measuring module 1210 configured to process the image data to measure at least one biometric feature of the ear, the at least one biometric feature being representative of the three-dimensional ear shape. The biometric features may for example be measurements defined by anatomical points of the ear, such as those described above in relation to FIG. 5A.

The apparatus 1200 has a matching module 1215 configured to determine the three-dimensional ear shape for the ear by matching said at least one biometric feature with one of a plurality of pre-stored three-dimensional ear shapes. The plurality of pre-stored three-dimensional ear shapes may for example be stored in a database as described in more detail above.

Example systems including the apparatus 1200 will now be described with reference to FIGS. 13A and 13B.

Figure 13A:
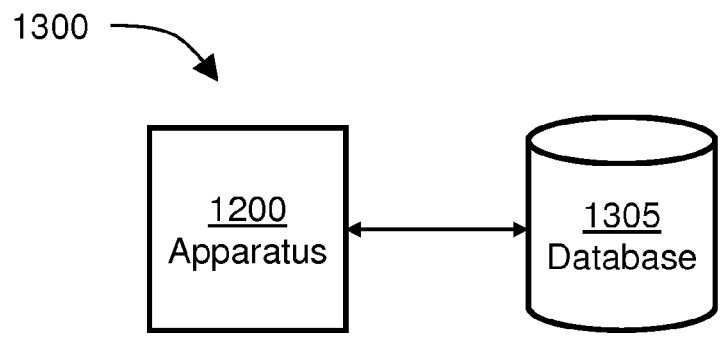
FIGS. 13A and 13B show schematically systems according to embodiments of the present invention.

Referring to FIG. 13A, a system 1300 includes the apparatus 1200 and a database 1305. The database 1305 stores the pre-stored three-dimensional ear shapes. The apparatus 1200 uses the biometric features measured from a captured image to identify the pre-stored three-dimensional ear shape which provides the best match as described in more detail above.

Figure 13B:
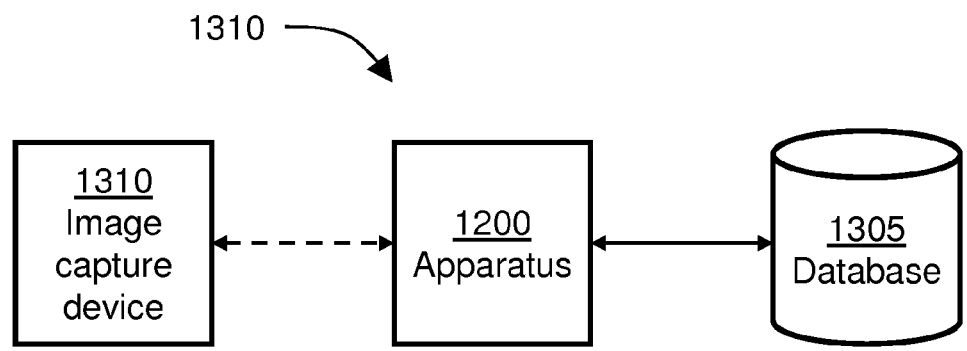

Referring to FIG. 13B, a system 1310 includes the apparatus 1200 and database 1305 as shown in FIG. 13A. Furthermore, the system 1310 includes an image capture device 1310, such as a smartphone including a camera. The image capture device 1310 is communicatively coupled to the apparatus 1200. The image capture device 1310 is configured to capture the two-dimensional image of the ear, confirm that the image meets predefined quality criteria as described in more detail above and, responsive to the confirming, process the two-dimensional image to produce the image data and transmit the image data to the receiving module of the apparatus 1200.

As discussed above, the three-dimensional shape for an insert is typically a trimmed form of a three-dimensional shape that would precisely engage the ear. It will be appreciated that the pre-stored three-dimensional shapes in the database corresponding to different ears could be stored untrimmed or trimmed. In either case, the three-dimensional shape of the insert can be determined from the pre-stored three-dimensional shape.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of producing an ear insert, the insert having a three-dimensional shape which is derived from image data corresponding to a two-dimensional image of an ear, the method comprising:
   receiving, at a server from a remote device, the image data corresponding to the two-dimensional image of the ear;
   scaling and re-orienting, at the server, the image data, to be within a predetermined acceptable range for the server to determine whether the image data satisfies an image quality criteria suitable for a matching operation; and when the image data does not satisfy the image quality criteria, rejecting the image data and transmitting to the remote device from the server a request for replacement image data;
   extracting, at the server, particular anatomical features and making associated measurements from the image data to obtain at least one biometric feature of the ear, the at least one biometric feature of the ear being representative of a three-dimensional shape of at least part of the ear; and
   determining, at the server, the three-dimensional shape by matching said at least one biometric feature of the ear with one of a plurality of pre-stored three-dimensional ear shapes, wherein each pre-stored three-dimensional ear shape corresponds to a respective ear.

2. The method according to claim 1, wherein the at least one biometric feature of the ear is matched to a two-dimensional ear representation corresponding to said one of the plurality of pre-stored three-dimensional ear shapes.

3. The method according to claim 2, wherein the two-dimensional ear representation comprises a representation of the at least one biometric feature of the ear.

4. The method according to claim 3, wherein:
   said representation of the at least one biometric feature of the ear is determined from a two-dimensional ear image corresponding to said one of the plurality of pre-stored three-dimensional ear shapes.

5. The method according to claim 2, wherein the two-dimensional ear representation comprises a two-dimensional ear image corresponding to said one of the plurality of pre-stored three-dimensional ear shapes.

6. The method according to claim 1, wherein the matching comprises:
   determining that a property of said at least one biometric feature of the ear is within a tolerance of a corresponding property of said one of the plurality of pre-stored three-dimensional ear shapes.

7. The method according to claim 1, wherein said at least one biometric feature of the ear comprises at least one measurement of a feature of the ear.

8. The method according to claim 7, wherein the at least one measurement of a feature of the ear comprises a measurement of a helix curvature of the ear.

9. The method according to claim 7, wherein the at least one measurement of a feature of the ear comprises a measurement of at least one triangle defined by three predefined anatomical points of the ear.

10. The method according to claim 9, wherein the three predefined anatomical points are located on:
    the helix of the ear;
    the *Fossa triangularis* of the ear; and
    the lobe of the ear.

11. The method according to claim 9, wherein the three predefined anatomical points of a triangle of the at least one triangle are located on:
    the intertragic notch of the ear;
    the *Fossa triangularis* of the ear; and
    the antihelix of the ear.

12. The method according to claim 9, wherein the three predefined anatomical points of a triangle of the at least one triangle are located on:
    the intertragic notch of the ear;
    the tragus of the ear; and
    the antitragus of the ear.

13. The method according to claim 9, wherein the three predefined anatomical points of a triangle of the at least one triangle are located on:
    the antihelix of the ear;
    the tragus of the ear; and
    the helix of the ear.

14. The method according to claim 1, wherein:
    each of the plurality of pre-stored three-dimensional shapes is produced by three-dimensionally scanning a respective ear canal.

15. The method according to claim 1, further comprising:
    manufacturing an earbud having a shape corresponding to the three-dimensional shape of the insert.

16. The method according to claim 1, further comprising:
    constraining the matching according to at least one matching constraint.

17. The method according to claim 1, further comprising:
    identifying an object of known spatial dimension in the two-dimensional image; and
    calculating a scale of the two-dimensional image relative to the object of known spatial dimension.

18. A server adapted to produce an ear insert, the insert having a three-dimensional shape which is derived from image data corresponding to a two-dimensional image of an ear, the server comprising:
    a receiving module configured to receive at the server from a remote device, the image data corresponding to the two-dimensional image of the ear, the receiving module determining whether the image data received by the server satisfies image quality criteria, the receiving module configured to reject the image data by the server if the received image data does not satisfy the image quality criteria and to send a signal from the server to the remote device requesting replacement image data;
    a measuring module configured to scale and re-orient, at the server, the image data, to be within a predetermined acceptable range for the server;

an extraction module configured to extract, at the server, particular anatomical features and make associated measurements from the image data to obtain at least one biometric feature of the ear, the at least one biometric feature of the ear being representative of a three-dimensional shape of at least part of the ear; and a matching module configured to determine, at the server, the three-dimensional shape by matching said at least one biometric feature of the ear with one of a plurality of pre-stored three-dimensional ear shapes, wherein each pre-stored three-dimensional ear shape corresponds to a respective ear.

19. A system comprising the server according to claim 18, further comprising:

a database for storing the pre-stored three-dimensional ear shapes.

20. A system comprising the server according to claim 19, further comprising:

a manufacturing apparatus configured to manufacture an earbud with a shape corresponding to the three-dimensional ear shape.

21. The system according to claim 20, wherein the server is connected to a three-dimensional printing, or additive manufacturing, system.

* * * * *